May 12, 1970 L. M. HORNUNG 3,511,977

ELECTRONIC COUNTER

Filed Sept. 12, 1966 5 Sheets-Sheet 1

INVENTOR.
LOUIS M. HORNUNG

BY John W Girvin, Jr.
ATTORNEY.

FIG. 4

| | WORD TIME | | | | | | | | | |
|---|---|---|---|---|---|---|---|---|---|---|
| | 1ST | 2ND | 3RD | 4TH | 5TH | 6TH | 7TH | 8TH | 9TH | 10TH |
| P & Q DIRECT | IAW → MAR +2 | M → A | A → MAR (Q ADD) | M → B | A → MAR (P ADD) | M ± B → M | | | | |
| Q INDIRECT | IAW → MAR +2 | M → A | A → MAR (Q ADD) | M → B +1 IF BUMP | B → MAR | M → B | A → MAR (P ADD) | M ± B → M | | |
| P INDIRECT | IAW → MAR +2 | M → A | A → MAR (Q ADD) | M → B | A → MAR (P ADD) | M → A +1 IF BUMP | A → MAR | M ± B → M | | |
| P & Q INDIRECT | IAW → MAR +2 | M → A | A → MAR (Q ADD) | M → B +1 IF BUMP | B → MAR | M → B | A → MAR (P ADD) | M → A +1 IF BUMP | A → MAR | M ± B → M |
| IMMEDIATE | IAW → MAR +2 | M → A | A → MAR (P ADD) | M ± A → M | | | | | | |

FIG. 5

| | WORD TIME | | | | | | | | | |
|---|---|---|---|---|---|---|---|---|---|---|
| | $I_1$ | $I_2$ | $I_3$ | $I_4$ | $I_5$ | $I_6$ | $I_7$ | $I_8$ | $I_9$ | $I_{10}$ |
| P & Q DIRECT | IAW → MAR +2 | M → A | A → MAR (Q ADD) | | | M → B | A → MAR (P ADD) | | | M ± B → M |
| Q INDIRECT | IAW → MAR +2 | M → A | A → MAR (Q ADD) | M → B +1 IF BUMP | B → MAR | M → B | A → MAR (P ADD) | | | M ± B → M |
| P INDIRECT | IAW → MAR +2 | M → A | A → MAR (Q ADD) | | | M → B | A → MAR (P ADD) | M → A +1 IF BUMP | A → MAR | M ± B → M |
| P & Q INDIRECT | IAW → MAR +2 | M → A | A → MAR (Q ADD) | M → B +1 IF BUMP | B → MAR | M → B | A → MAR (P ADD) | M → A +1 IF BUMP | A → MAR | M ± B → M |
| IMMEDIATE | IAW → MAR +2 | M → A | | | | | A → MAR (P ADD) | | | M ± A → M |

May 12, 1970 L. M. HORNUNG 3,511,977

ELECTRONIC COUNTER

Filed Sept. 12, 1966 5 Sheets-Sheet 4

United States Patent Office 3,511,977
Patented May 12, 1970

3,511,977

ELECTRONIC COUNTER

Louis M. Hornung, Lexington, Ky., assignor to International Business Machines Corporation, Armonk, N.Y., a corporation of New York Filed Sept. 12, 1966, Ser. No. 578,791
Int. Cl. H03k 23/00, 21/16
U.S. Cl. 235—92 6 Claims

ABSTRACT OF THE DISCLOSURE

A high speed permutable binary counter wherein each counter stage includes a pair of binary storage elements termed counting and steering elements. Each counting element is responsive to a first source of timing pulses to assume the state of its associated steering element upon the occurrence of a timing pulse and remains in that state until the occurrence of a further timing pulse. Each steering element is responsive to a second source of timing pulses which occur alternatively with respect to the timing pulses from the first pulse source to assume a binary state dependent upon the state of the counting and steering elements of the preceding counter stage and upon the state of its associated counting element. The steering elements constitute a ripple counter while the counting elements constitute a non-ripple counter. Additionally, the steering elements can be permuted to any predefined state by control logic means which is responsive to the output signals of the counting elements.

This invention relates to an electronic counter and more particularly, to an electronic counter which is readily adaptable to control the functions of digital computers.

In the computer art, there is often the need for a counting or sequencing device which is adapted to control the sequencing of computer circuitry through a series of interrelated steps. The sequence of steps depends upon the operation to be performed by the computer and, because of the great flexibility demanded by today's computer user, it is necessary that the computer be capable of performing a great number of operations with each operation being defined by a unique sequence of steps. In other words, it may be necessary for the computer to perform steps *a*, *b*, *c*, *d*, and *e* in that order for one operation and steps, *a*, *c*, and *d* in that order for another operation. The sequencing device that controls the computer during each operation must be capable of presenting an output which corresponds to steps *a*, *b*, *c*, *d*, and *e* for the first operation and an output which corresponds to steps *a*, *c*, and *d* for the other. The time duration between steps must be the same for each instance, and it must be extremely short.

Further, the next sequential step which the computer takes often depends upon what occurred during the previous steps. Thus, the sequencing device utilized must have the capability to designate and control the step being executed while at the same time be responsive to results generated in order to rapidly change to provide an output representative of the next step required.

Many prior art high speed counters have been utilized in various ways to control sequencing in digital computers. Further, it is known to change the count or permute such prior art counters in response to a data processing result obtained during a previous count or step. However, with such prior art devices, once the counter is permuted, the previous count is lost and can no longer be utilized to control computer functions. Thus, with prior art counters, it has been necessary to precisely time the permuting signal so that it occurs at the end of the count cycle and after the computer no longer requires count information since an early permuting signal destroys the useful information contained in the counter.

Further, the permuting signal must not arrive late since the counter would then indicate the wrong count during the first portion of the following cycle. In order to solve the timing problems involved, prior art computers are prohibited from sampling the counter during the latter portion of the count cycle and the counter is permuted during this time. This puts a burdensome constraint on computer design where simplicity of internal timing and speed of operation are necessary.

Accordingly, it is a primary object of this invention to provide an improved permutable counting means which is readily adapted to control machine functions.

An additional object is to provide an improved sequencing device to control the sequencing of additional circuitry, and simultaneously set up to vary its own status in accordance with the condition of the additional circuitry.

A further object is to provide an improved counter having counting and steering elements wherein the steering elements are readily permutable while the counting elements are controlling machine functions.

A still further object is to provide an improved permutable counter having counting and steering elements wherein the steering elements ripple count and are permutable and wherein each of the counting elements is responsive only to its associated steering element.

Preferably, according to one feature of the invention, the foregoing and other objects are accomplished by providing a plurality of counter stages, each stage comprising a pair of binary storage circuits, one of which is termed a steering element and the other a counting element. The counting elements are caused to count during counting cycles and the steering elements count during steering cycles. A steering cycle precedes each counting cycle. The binary storage circuits are connected such that each counting element produces an output which is a function of its associated steering element. Further, each steering element produces an output which is a function of the preceding steering element, the preceding counting element, and its associated counting element. Thus, in effect, the steering elements constitute a ripple counter, while the counting elements constitute a non-ripple counter.

According to another feature of the invention, additional input pulses may be applied to the steering elements of the counter thereby setting them to a pre-determined desired count value, while not affecting the counting elements until the next subsequent counting cycle.

The foregoing and other objects, features and advantages of the invention will be apparent from the following more particular description of the preferred embodiment of the invention as illustrated in the accompanying drawings.

In the drawings:

FIG. 4 is a table showing the sequence of steps taken by a digital computer while performing different operations.

FIG. 5 is a table derived by rearranging the elements of the table of FIG. 4 so that similar steps occur at similar word times for each operation.

Figure 1:
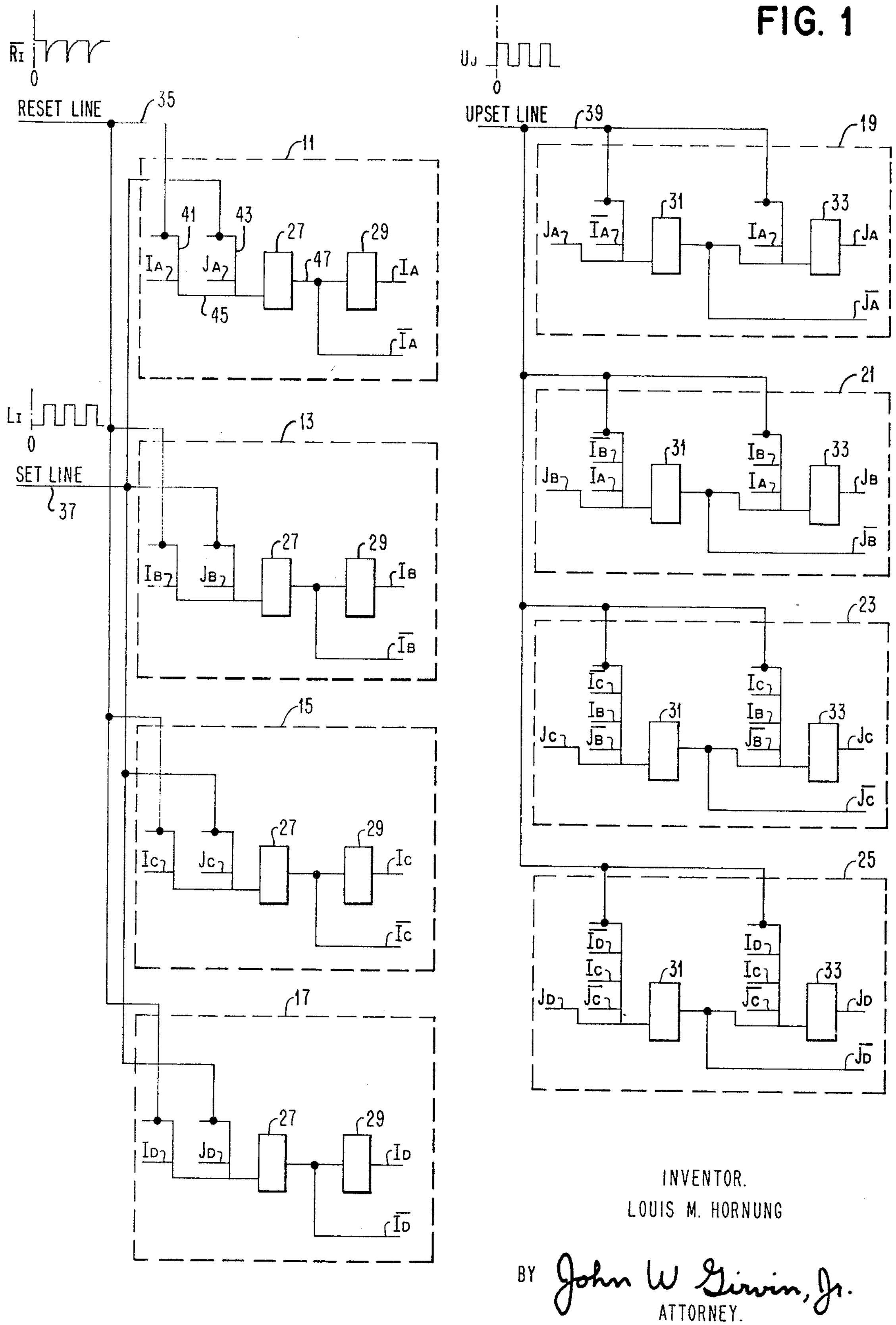
FIG. 1 is a logic block diagram of a counter embodying the principles of the invention.

Referring now to the drawings and initially to FIG. 1 thereof, a four stage electronic binary counter is shown. The counter comprises four counting elements 11, 13, 15, and 17 and four steering elements 19, 21, 23, and 25. Each counting element consists of two logic elements 27 and 29 while each steering element also consists of two logic elements 31 and 33.

Each counting element provides an in phase output signal on line $I_N$ and an out of phase output signal on line $\overline{I_N}$ (pronounced "not $I_N$") where the subscript N represents alphabetic subscripts A to D. Each steering element also provides an in phase output signal on line $J_N$ and an out of phase output signal on line $\overline{J_N}$.

The counter is adapted to receive three independent trains of clock pulses which appear on the reset line 35, the set line 37, and the upset line 39. The steering elements change state in response to clock pulses $U_J$ appearing on the upset line 39 while the counting elements change state in response to clock pulses $L_I$ and $\overline{R_I}$ appearing on the set line 37 and the reset line 35.

Further, as will be described hereinafter, each counting element is responsive to its associated steering element and each steering element is responsive to its associated counting element, the preceding counting element, and the preceding steering element. Thus, for example, the state that counting element 15 will assume upon the occurrence of pulses on set line 37 and reset line 35 will depend solely on the state of steering element 23. The state that steering element 23 will assume upon the occurrence of a pulse on upset line 39 will depend upon the state of counting element 15, counting element 13, and steering element 21.

As mentioned above, each counting element consists of logic elements 27 and 29 while each steering element consists of logic elements 31 and 33. These logic elements along with the network of lines connected to them diagrammatically represent a plurality of AND, OR and inverter logic circuits. Such logic circuits are well known in the electronics art and will not be discussed in detail herein. The following discussion will describe how the logic elements and lines diagrammatically represent the well known logic circuits.

Each logic element 27, 29, 31 and 33 operates so that a positive input signal applied on the left side of the element will cause a negative output signal to appear on the right side of the element and so that a negative signal applied on the left side of the element will cause a positive signal to appear on the right side of the element. Thus, each logic element performs a signal inversion function. Further, all horizontal lines connected to the same vertical line represent a positive AND function while all vertical lines connected to the same horizontal line represent a positive OR function.

For example, referring to counting element 11, it can be seen that reset line 35 and a line labeled $I_A$ are both connected to the same vertical line 41 while the set line 37 and a line labeled $J_A$ are both connected to the same vertical line 43. Each vertical line 41 and 43 is connected to horizontal line 45 which is connected to the left side or input side of logic element 27. In operation, the coincidence of a positive signal on reset line 35 and a positive signal on line $I_A$ will satisfy the positive AND function thereby driving line 41 positive. Similarly, a positive pulse on set line 37 coincidental with a positive pulse on line $J_A$ will cause line 43 to go positive. As mentioned above, vertical lines connected to the same horizontal line represent a positive OR function. Thus, it can be seen that a positive pulse appearing on line 41 or line 43 will drive line 45 positive. As discussed above, when line 45 which is connected to the input or left side of logic element 27 goes positive, the output of element 27, line 47, will go negative. When line 47 which forms the input to logic element 29 is negative, the output of element 29, line $I_A$, is positive. This line $I_A$ is connected directly to the line $I_A$ shown as an input to line 41. This connection has not been shown for purposes of clearness and simplicity. Further, all lines having the same label are directly connected to one another.

Each counting element 13, 15, and 17 operates in a similar manner as that described above with respect to counting element 11. The same form of logic notation is also utilized for the steering elements 19, 21, 23, and 25. Logic elements 31 and 33 are similar to logic element 27 differing only in the number of input lines applied thereto.

Figure 2:
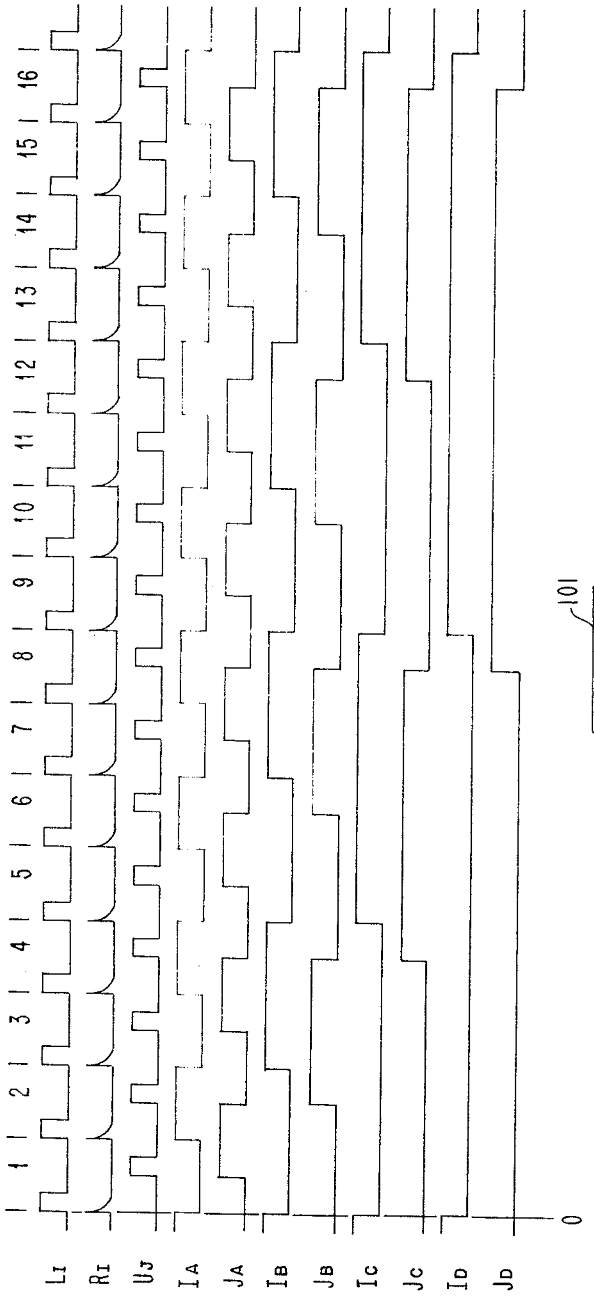
FIG. 2 is a timing diagram of the counter shown in FIG. 1.

As mentioned above, the counter is adapted to receive three independent trains of pulses which appear on reset line 35, set line 37 and upset line 39. The first two trains of pulses gate the counting elements at the start of a counting cycle while the latter gates the steering elements at the start of a steering cycle. Referring to FIG. 2 which is a timing diagram for the counter logically shown in FIG. 1, it can be seen that the pulses $L_I$ appearing on the counting element set line 37 are out of phase with the pulses $U_J$ appearing on the steering element upset line 39 and are in phase with the pulses $R_I$, the inverse of which, $R_I$, appears on the counting element reset line 35. It will also be noted that the pulses $L_I$ occur for a longer time duration than the pulses $R_I$ and that the $L_I$ pulses completely overlap the $R_I$ pulses.

Referring once again to FIG. 1, in order to obtain a clear understanding of how the counter shown therein operates, the following description of the counter's operation will assume that all of the counting elements 11, 13, 15, and 17 and all steering elements 19, 21, 23, and 25 are initially set to their off states. Thus, the signals on the in phase output lines of the counting elements, $I_A$, $I_B$, $I_C$, and $I_D$ are negative as are the signals on the in phase output lines $J_A$, $J_B$, $J_C$, and $J_D$, of the steering elements. Correspondingly, the out of phase output lines $\overline{I_A}$, $\overline{I_B}$, $\overline{I_C}$, and $\overline{I_D}$ of the counting elements and the out of phase output lines $\overline{J_A}$, $\overline{J_B}$, $\overline{J_C}$, and $\overline{J_D}$ of the steering elements are positive.

Referring now to steering element 19 of FIG. 1, when a positive pulse $U_J$ appears on upset line 39, there will be a coincidence of positive signals appearing on horizontal line 39 and horizontal line $\overline{I_A}$, both of which are connected to the same vertical line. As discussed above, the concurrence of positive signals appearing on all the horizontal lines connected to a common vertical line causes the vertical line to go positive. This is a diagrammatic representation of an AND circuit well known in the art. Hence, the coincident appearance of positive signals on line $\overline{I_A}$ and line 39 will provide a positive input signal on the left side of logic element 31. The positive input signal appearing on the left side of logic element 31 causes a negative output signal to appear on the right side of logic element 31. This negative output signal becomes a negative input signal to logic element 33 thereby causing its output line $J_A$ to become positive. The line $J_A$ is coupled directly back to the input side of logic element 31 to thereby keep the output signal of element 31 and hence the input signal of logic element 33 negative. Thus, when line $J_A$ goes positive, it will remain positive until steering element 19 is reset by applying a positive input to logic element 33. A positive input signal to logic element 33 will cause line $J_A$ to go negative. Such resetting is accomplished when there is a coincidence of positive signals on line $I_A$ and upset line 39. Bringing an output signal such as that on line $J_A$ back to form an input signal which keeps a bi-stable device in its current state is known in the art as performing a latch back function. Referring again to FIG. 2, it can be seen that the signal on output line $J_A$ goes positive with the first pulse $U_J$ appearing on the upset line 39.

The next pulse to appear in time appears on the counting latch set line 37 and is shown diagramatically in FIG. 2 as pulse $L_I$. It is also noted that the pulse $\overline{R_I}$ appearing on the counting latch reset line 35 which is the inverse of pulse $R_I$ shown in FIG. 2 appears simultaneously with pulse $L_I$ and is negative for a shorter time duration than the time duration that pulse $L_I$ is positive. Referring once again to FIG. 1, it can be seen that when a pulse occurs on the counting element set line 37, and when the signal on output line $J_A$ of steering element 19 is positive, line 43 will go positive which in turn drives line 45 positive which thereby provides a positive input signal to logic element 27. This positive input signal to logic element 27 will cause the output line 47 of logic element 27 to go negative. This negative output signal is the input signal to logic element 29 which will then provide a positive output signal on line $I_A$. This positive output signal is latched back to vertical line 41. Since the pulse $\overline{R_I}$ appearing on the reset line 35 is positive before the end of the pulse $L_I$ appearing on the set line 37, both inputs to vertical line 41 are positive thereby satisfying the AND condition and hence driving line 41 positive. When line 41 is positive, line 45 will remain positive, and as discussed above, the output line $I_A$ of logic element 29 will be positive. This output will remain positive until reset line 35 goes negative.

Thus we have seen how steering element 19 was first set with a timing signal appearing on upset line 39 and how counting element 11 is then set with subsequent timing signal appearing on set line 37 and in accordance with the state of its associated steering element 19.

The next pulse appears on the upset line 39 and will cause steering element 19 to reset so that its output line $J_A$ is negative. The resetting is accomplished as described above because there is a coincidence of positive signals appearing on upset line 39 and line $I_A$ which thereby causes a positive signal to appear as an input to logic element 33.

In addition to resetting steering element 19, the pulse appearing on upset line 39 will condition steering element 21 to turn on. This is because at this point in time, line $I_A$, line $\overline{I_B}$, and line 39 will all be positive thereby providing a positive input to logic element 31 of steering element 21. This positive input to logic element 31 causes logic element 33 to provide a positive output on line $J_B$ in the same manner that a positive input to logic element 31 of steering element 19 provided a positive output on line $J_A$. The positive output on line $J_B$ of steering element 21 is sent back to its input forming a latch-back function in the same manner as discussed with respect to line $J_A$ of steering element 19. Thus, the second pulse $U_J$ appearing on the upset line 39 causes the output line $J_A$ of steering element 19 to go negative and causes the output line $J_B$ of steering element 21 to go positive.

At this point in time as can be seen with reference to FIG. 2, counting element 11 is providing a positive output signal on line $I_A$, steering element 21 is providing a positive output signal on line $J_B$, and all other counting and steering elements are providing a negative output signal on their in phase output lines.

The next pulses occurring timewise are pulses $L_I$ and $\overline{R_I}$ which occur simultaneously and are presented on set line 37 and reset line 35 of FIG. 1. The positive pulse appearing on set line 37 along with the positive output signal $J_B$ of steering element 21 conditions logic element 27 of counting element 13 thereby producing a positive output signal on line $I_B$ in a similar manner to that described above with respect to counting element 11. Further, at this time the pulse $\overline{R_I}$ appearing on reset line 35 goes negative thereby resetting counting element 11 so that the signal on output line $I_A$ goes negative.

At this point in time, the output of steering element 21, line $J_B$, is positive, the output of counting element 13, line $I_B$, is positive and all other in phase outputs of the counting and steering elements are negative.

The next pulse to occur timewise occurs on upset line 39 and causes steering element 19 to change state so as to provide a positive signal on line $J_A$ in the same manner as described above. It is to be noted that steering element 21 does not change state at this point since its reset term appearing as an input to logic element 33, $I_B$ AND $I_A$, is not met (line $I_A$ being negative).

The next pulses occurring timewise occur on set line 37 and reset line 35. The pulse occurring on set line 37 causes counting element 11 to change state so as to provide a positive signal on line $I_A$ as discussed above. It is to be noted that counting element 13 does not reset since its set input overrides its reset input at this time (inputs $L_I$ on line 37 and $J_B$ cause the counting element to remain on thereby over-riding the resetting inputs $\overline{R_I}$ and $I_B$). Hence, at this point in time, steering elements 19 and 21 and counting elements 11 and 13 are providing positive in phase output signals while the remaining elements are providing negative in phase output signals.

The next pulse occurring timewise occurs on upset line 39. This pulse causes steering element 19 to reset as described above and also causes steering element 21 to reset since its reset term, $I_A$ AND $I_B$, AND $U_J$ is now met. When steering element 21 resets, positive signals appear on lines $U_J$, $\overline{I_C}$, $I_B$, and $\overline{J_B}$ thereby causing the output line $J_C$ of steering element 23 to go positive. The next pulses appearing timewise occur on reset line 35 and set line 37 simultaneously. Counting element 15 is set with the concurrence of a pulse appearing on the set line 37 and the positive output signal $J_C$ of steering element 23 in the same manner described above with the respect to the other counting elements. The pulse $\overline{R_I}$ occurring on the reset line causes counting elements 11 and 13 to reset to their off condition since their respective steering elements are in their off condition. Thus, at this point and time, steering element 23 and counting element 15 provide positive in phase output signals while the remainder of the steering and counting elements provide negative in phase output signals. Steering element 23 will continue to provide a positive output until its reset condition is met. The reset condition for this steering element is that the output line $J_B$ of the preceding steering element 21 will be negative while the output line $I_B$ of the preceding counting element 13 and the output line $I_C$ of its associated counting element 15 are positive. When steering element 23 resets, steering element 25 is set since its set condition, positive signals on lines $\overline{I_D}$, $I_C$, $\overline{J_C}$, and $U_J$ is met. When steering element 25 is set, the signal on its output line $J_D$ is positive and hence, the next subsequent pulse $L_I$ appearing on set line 37 will cause counting element 17 to set so as to provide a positive output on line $I_A$.

Thus, it can be seen that each counting element is set in accordance with the condition of its associated steering element while each steering element is set in accordance with the condition of the preceding steering element, the preceding counting element, and its associated counting element.

Hence, a salient feature of the invention is that the set and reset terms of the steering elements require no more than three inputs. This is accomplished by recognizing that the state of a particular stage will change when a preceding stage resets and by recognizing that this reset can be predicted by the counting element being on while the steering element is off. Further, it can be noted that the steering elements, in effect, form a ripple counter since each steering element sets upon the reset of preceding stage. The counting elements do not form a ripple counter since their output is dependent only on the input from its associated steering element. This allows for a high speed counting operation as delays from previous stages are not encountered during counting cycles.

As mentioned before, the requirements of modern computers are such that the sequencing device controlling them must be able to provide one of a plurality of unique step sequences in accordance with the operation to be performed. Thus, the sequencing device must be capable of permuting from one count to another. The essential difference between counting and permuting is that influences which are external to the counter contribute to the determination of what the next state of the counter will be when permuting. When all such external influences are quiescent, the counter will count in its normal manner as described above; that is, the counter will advance to a state which is determined by the counter itself. In the description which follows, the general logic diagram of a permutable counter in a data processing machine environment will be described.

Figure 3:
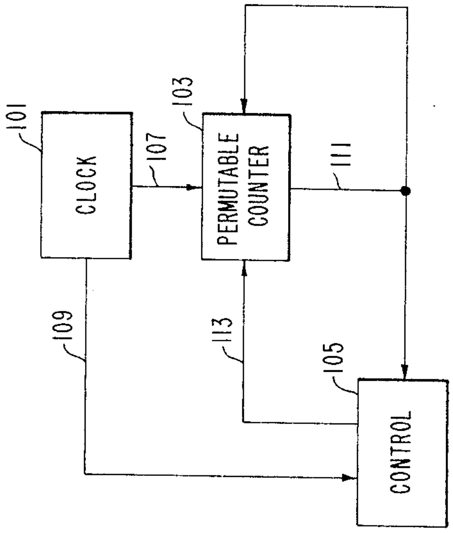
FIG. 3 is a general block diagram of a permutable counter.

Referring now to FIG. 3, a block diagram representing the logic flow of a permutable counter is shown. Three functional blocks, clock 101, permutable counter 103, and control 105 are represented. The clock 101 provides trains of pulses to the permutable counter 103 through the clock pulse interface 107. These trains of pulses are similar to the trains of pulses occurring on the set, reset, and upset lines of the counter described above with respect to FIG. 1. The clock also provides trains of pulses to control 105 through the clock control interface 109. The output of the permutable counter 103 appears on line 111. This output is sent back to form an input to the counter in order that the counter may determine what the next count should be upon the occurrence of the next pulse on the clock pulse interface. The output of the counter is also sent to control 105. Control 105 makes a logical determination as to whether the permutable counter 105 should continue counting in its normal mode, or whether it should permute to a preselected count. If it determines that the counter 103 should permute, it sends a signal to the counter through the permuting interface 113 which sets the counter to a predetermined state. Counters which are utilized in an environment where permutation is not necessitated have the permuting interface 113 and the control 105 removed. The counter described above with respect to FIG. 1 has no controls associated with it which would allow it to permute from one state to a subsequent predetermined state.

The description which follows will describe how the counter shown in FIG. 1 is modified by the addition of control circuitry so it can be utilized in an environment wherein permutation is necessitated. More specifically, the counter described above with respect to FIG. 1 will be described as controlling the arithmetic functions of a computer. The computer is set up to cycle through a plurality of sequential steps which have been designated as "word times" when performing arithmetic functions. Each sequential step or word time defines a general type of data flow and the sequence of steps is dependent upon the arithmetic function or operation to be performed.

Referring now to FIG. 4, a table is shown wherein the general data flow of such a computer is defined in accordance with the arithmetic function or operation to be performed and the word time. It can be seen that there are ten word times labeled "1st" through "10th" and five operations labeled "P & Q DIRECT," "Q INDIRECT", "P INDIRECT," "P & Q INDIRECT," and "P IMMEDIATE." The data flow that results during each each word time of each operation is represented diagrammatically by a plurality of symbols. An understanding of exactly what occurs within the computer as represented by these symbols is not necessary for an understanding of the present invention. However, it is necessary to note that each operation is defined by a unique sequence of symbols or steps and further, that some of the symbols or steps utilized in one operation are also utilized in another operation. Additionally, it should be noted that the steps shown in FIG. 4 can be rearranged as shown in FIG. 5 by inserting blank steps in order that the step performed during a word time is the same for every operation.

In order that those skilled in the computer art may have a ready understanding of what the table of symbols represents and also an understanding of the utilization of the present invention in such an environment, the following narration will relate to a detailed description of the symbols in terms of computer operation. As is known in the computer art, each computer instruction consists of an operation portion and an address portion. The former defines the operation to be performed while the latter defines the data to be operated upon. In a two address computer, two sets of data are defined by the address portion of the instruction. In the computer to be described, these have been designated as the P address and the Q address. The operation to be performed defines whether either or both of these addresses will be direct addresses, indirect addresses, or immediate addresses. As is known in the computer art, a direct address is utilized to gate out the data to be operated upon from a memory or storage location defined by the direct address. An indirect address defines a memory location which contains data that defines memory location of the data to be operated on. An immediate address contains the data to be operated upon and does not address memory.

Further, as appreciated by those skilled in the art, each computer has a plurality of registers which are utilized as temporary storage for data and instructions. These registers are connected so as to address memory locations and/or to receive and transmit information from and to memory. For example, many computers have a register utilized to address memory locations in accordance with the information stored in the register. Such registers are often called memory address registers. Additionally, computers are provided with a plurality of data registers adapted to receive data from and transmit data to the memory location defined by the memory address register. These data registers are often designated as A, B, C, etc. registers. An additional register often found in such computers is the instruction address word register. It is the function of this register to keep track of the memory location containing the next computer instruction.

With these factors in mind, reference is now made to FIG. 4. The data flow represented by each symbol shown in the table of FIG. 4 will be discussed. A close inspection of the table will reveal that ten unique steps appear therein. Further, all of these steps occur during a P and Q indirect operation. Therefore, the following description will utilize by way of example the P and Q indirect operation to describe the data flow which occurs in the computer during each unique step or word time. When the operation to be performed uses indirect addressing for both the P and Q address fields of an instruction, the general data flow that results during the first word time of the computer's operation is found in the first column at the fourth line of the table of FIG. 4. This general data flow is represented schematically as

"IAW→MAR"

+2

During this computer cycle, the instruction address word is transferred from the instruction address word register (IAW) into the memory address register (MAR) and, after being incremented by plus 2, it is written back into the instruction address word register. At the end of this word time the memory address register will contain the storage location of the instruction and the instruction address word register will contain the storage location of the next subsequent instruction. During the second word time, the data in the memory location (M) addressed by the memory address register (MAR) is destructively read from the memory and gated into the A register (A) and the contents of the A register are then written back into the memory location (M). This is represented schematically by

"M→A"

At the end of the word time, the A register contains the computer instruction including the address information.

During the third word time, a specified portion of the data in the A register, namely the Q address portion (Q ADD), is written into the memory address register (MAR) and the data thus put in the memory address register is written back into the A register. This is shown in the table as: "A→MAR (Q ADD)." At the end of his word time, the memory address register contains the indirect address of the Q data field. During the fourth word time, the data that is located in memory at the location specified by the memory address register is read into the B register and the data is indexed or bumped by plus 1 if specified. The B register then contains the complete address of the Q data field. This is shown in the table of FIG. 4 as:

"M→B"

+1 IF BUMP

During the fifth word time, the contents of the B register are transferred to the memory address register which then contains the address of the Q data field. This is shown schematically as "B→MAR." During the sixth word time, the Q field data that is located in memory at the location specified by the memory address register is read into the B register and is then read from the B register back into memory. This is shown as: "M→B." At this point in time, the B register contains the data specified indirectly by the Q address.

During the seventh word time, the P address portion of the word stored in the A register is read into the memory address register. This is shown schematically as:

"A→MAR (P ADD)"

At the end of this word time, the indirect address of the P data field is located in the memory address register.

During the eighth word time, the data located in memory at the address specified by the memory address register is read into the A register. The address of this data is indexed or bumped by plus 1 if specified. The A register then contains the complete address of the P data field. During the ninth word time, the address of the P data field located in the A register is read into the memory address register. This is shown as:

"A→MAR"

During the tenth word time, the P data field located in memory at the address specified by the memory address register is added or subtracted to the Q data field located in the B register. The result of the addition or subtraction is stored back in memory at the locaation specified by the memory address register. That is, it is written over the P data field in memory. This is shown as: "M±B→M."

Thus, we have seen the series of sequential steps that the computer must step through in order to perform an arithmetic operation wherein all data is indirectly addressed. It is to be noted that during each word time, a unique data flow results.

Referring now to the row in the table of FIG. 4 labeled "P & Q DIRECT," it can be seen that during the first, second, and third word times, that operational step performed by the computer is the same as that performed during the first, second and third word times of a P and Q indirect operation. Thereafter, the operations performed differ as compared with the P and Q indirect operation. However, it can be seen that the steps performed during the fourth, fifth, and sixth word time of a P and Q direct operation are performed during the sixth, seventh, and tenth word times respectively of a P and Q indirect operation.

A further inspection of the table shown in FIG. 4 will reveal that the steps performed during the first and second word times of all operations are the same. Thereafter, the sequence of steps differ in accordance with the operation performed, but all of the steps performed during any instruction are also performed at some word during a P and Q indirect instruction. Thus, for example, the step performed during the fifth word time of a P and Q direct operation and a P indirect instruction, that performed during the seventh word time of a Q indirect instruction, and the step performed during the third word time of an immediate instruction are the same step and this step can be found during the seventh word time of a P and Q indirect instruction.

Referring now to FIG. 5, a table is shown wherein the steps shown in the table in FIG. 4 have been rearranged so that for any given word time, the step performed by the computer will be similar regardless of the type of operation required. It will be noted that for each operation, the same sequence of steps has been utilized as discussed previously with respect to FIG. 4. However, blank or dummy steps have been inserted between steps that were adjacent to one another in the table in FIG. 4. For example, referring to the P and Q direct operation, the steps to be performed during the first three word times $I_1$, $I_2$, and $I_3$ are the same as those which occur during the first three word times, 1st, 2nd, and 3rd of FIG. 4. The step performed during the fourth word time in the table of FIG. 4 is now performed during the sixth word time $I_6$ as shown in FIG. 5. The fourth and fifth word times $I_4$ and $I_5$ in FIG. 5 are shown as blank cycle times. Similarly, the step performed during the fifth word time in FIG. 4 has been changed to be performed during the seventh word time, $I_7$, of FIG. 5, and the step performed during the sixth word time as shown in FIG. 4 has been changed to occur during the tenth word time, $I_{10}$, in FIG. 5. By rearranging the table and hence setting up the computer in this manner, the control circuits required to control the computer in the performance of each of these steps has been greatly reduced. That is, during a given word time, the computer would perform a specified step or it would take a blank cycle. Thus, the control logic to implement the table shown in FIG. 5 would be far less complex than the control logic needed to implement the table shown in FIG. 4 where the step to be performed during a given word time could be one of five in accordance with the operation performed. However, if the computer had to step through all of the blank cycles shown in FIG. 5, simplicity and numerical reduction of control circuits would be achieved by greatly reducing speed. This is because non-productive or blank cycles would be taken during all operations except a P and Q indirect instruction. Since speed reduction is not desirable, it is necessary that the sequencing device controlling the word times be adapted to skip or permute through the blank cycles.

Hence, in order to speed up the cycle time of the computer during all operations having blank cycles, and yet provide counting means to control the sequence of steps to be performed, it is necessary to be able to permute the counter. For example, when performing a P and Q direct operation, one would want to permute the counter from word time $I_3$ to word time $I_6$, and also from word time $I_7$ to word time $I_{10}$ in order to avoid the blank cycles. Thus, the counter would count in its normal manner up to word time $I_3$ and then be set or permuted to word time $I_6$. Thereafter, it would count to word time $I_7$ and be set to word time $I_{10}$. Therefore, during a P and Q direct operation, the counting sequence would be: 1, 2, 3, 6, 7, 10. Further, it can readily be appreciated that the counter must indicate at its output a true count during the complete word time cycle. That is, during the complete word time $I_3$ the counter must indicate a count of 3. It then must indicate a count of 6 in the example given for the duration of the next word time. It must do this with the same cycle speed required for regular counting. That is, it must skip to a count of 6 with the same clock pulse which would normally make it progress to a count of 4.

Referring once again to FIG. 1, the counter shown therein is permuted by altering the steering latches prior to the clock pulse, $L_I$ appearing on the set line 37 of the counting elements. This alteration supersedes the counting function of the steering elements. Since the state that the counting elements assume upon the occurrences of clock pulses appearing on the set line 37 and the reset line 35 is dependent solely upon the state of the steering elements, it can be readily appreciated that the steering elements can be permuted while the counting elements are controlling machine functions and that the counting elements will then permute upon the occurrence of the next counting cycle clock pulse.

In order to permute the steering elements of the counter shown in FIG. 1, additional circuitry and timing pulses are required. This circuitry and timing corresponds to the control block 105, the clock control interface 109 and the counter control interface 113 of FIG. 3. To illustrate the method of permuting this counter, an implementation for the arithmetic operations of the computer described above with respect to FIGS. 4 and 5 will be described. Referring to FIG. 5, it can be seen that the permutations to be performed are:

(1) $I_2$ to $I_7$ for Immediate Instructions;
(2) $I_3$ to $I_6$ for P and Q Direct Instructions and for P Indirect Instructions;
(3) $I_7$ to $I_{10}$ for P and Q Direct Instructions, for Immediate Instructions, and for Q Indirect Instructions;
(4) $I_{10}$ to $I_1$ for all Instructions.

The additional control circuitry required must recognize the conditions that are present when permutation is required and generate the proper timing and control signals to the counter to effect permutation. For example, this circuitry must recognize that when an immediate instruction is being performed, that permutation must take place after word time $I_2$, after word time $I_7$ and after word time $I_{10}$. Thus, the control circuitry must recognize the type of instruction being performed and the current word time in order to know when to generate a signal that will cause the counter to permute.

For the computer example given, consider that the operational portion of the instruction word is stored in a three binary bit position operation register, $N_1$, $N_2$, and $N_3$, and that the state of this register defines the type of operation to be performed according to the following Karnaugh Map:

$N_2$ (spans columns 2–3)

| | P & Q DIRECT | Q INDIRECT | P & Q INDIRECT | P INDIRECT |
|---|---|---|---|---|
| $N_1$ | IMMEDIATE | IMMEDIATE | IMMEDIATE | IMMEDIATE |

$N_3$ (spans columns 3–4)

Each type of operation is uniquely defined by the state of the three position register. For example, the P & Q DIRECT operation is defined as $\overline{N_1}$ and $\overline{N_2}$ and $\overline{N_3}$, the P INDIRECT operation is defined as $\overline{N_1}$ and $\overline{N_2}$ and $N_3$, the Q INDIRECT operation is defined as $\overline{N_1}$ and $N_2$ and $\overline{N_3}$, the P & Q INDIRECT operation is defined as $\overline{N_1}$ and $N_2$ and $N_3$, and the IMMEDIATE operation is defined as $N_1$. Each bit position of this register can be any bistable device capable of supplying an output signal representative of its state. Such registers are well known in the computer art and will not be described in detail herein. This register forms that part of the control circuitry necessary to define the operation being performed.

As discussed above, the additional control circuitry required in order to permute the clock not only must recognize the type of instruction being performed, but it also must recognize the current status of the counter. That is, the control circuitry must be able to detect the word time, $I_1$ to $I_{10}$, that the counter is presenting as an output. The word times $I_1$ to $I_{10}$ are derived from the signals appearing on the output lines $I_A$, $\overline{I_A}$, $I_B$, $\overline{I_B}$, $I_C$, $\overline{I_C}$, $I_D$ and $\overline{I_D}$ of the counting elements of FIG. 1 as shown by the following Karnaugh Map:

$I_A$ (spans columns 2–3); $I_C$ (rows 2–3); $I_D$ (rows 3–4); $I_B$ (columns 2–3)

| | | | |
|---|---|---|---|
| $I_1$ | $I_2$ | $I_4$ | $I_3$ |
| $I_5$ | $I_6$ | $I_8$ | $I_7$ |
| X | X | X | X |
| $I_9$ | $I_{10}$ | X | X |

It can thus be seen that any word time $I_1$ to $I_{10}$ is defined by a unique combination of outputs $I_A$, $I_B$, $I_C$, and $I_D$. For example, $I_1$ is defined as $\overline{I_A}$ and $\overline{I_B}$ and $\overline{I_C}$ and $\overline{I_D}$. The word times $I_1$ to $I_{10}$ can readily be defined by a plurality of AND circuits, one for each word time, all of which have for their inputs the combinations of $I_A$, $I_B$, $I_C$, and $I_D$ as defined in the above table. Such AND circuits are well known in the art and will not be discussed in detail herein. These AND circuits form that part of the control circuitry necessary to define the current word time or status of the computer.

Figure 6:
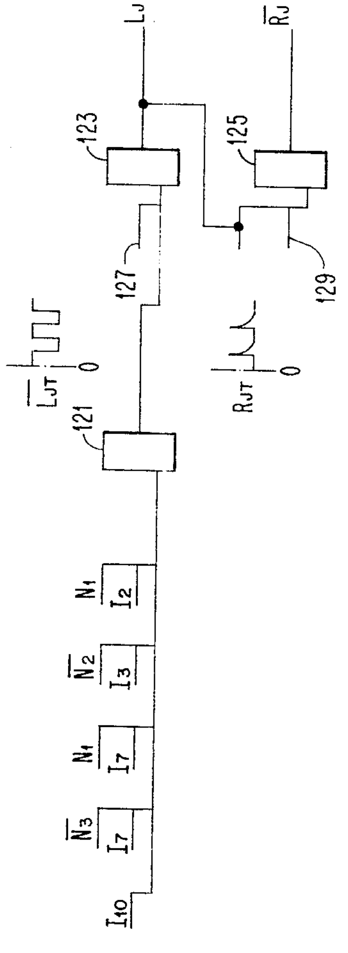
FIG. 6 is a logic diagram showing the logic necessary to generate timing for permuting the clock shown in FIG. 1.

FIG. 6 shows additional control circuitry utilized to generate a signal that defines the time that the counter shown in FIG. 1 will permute in accordance with the instruction to be performed and in accordance with the current status of the counter. This circuitry consists of logic elements 121, 123, and 125 along with output lines $L_J$ and $\overline{R_J}$. Signals appearings on input lines 127, 129, $I_M$ and $N_M$ where the subscript M represents an integer are combined as discussed heretofore with horizontal lines connected to the same vertical line representing a positive AND function and with vertical lines connected to the same horizontal line representing a positive OR function. These lines as combined form an input to the logic elements. The input lines $N_M$ are connected to the three position operation register (not shown) described above which defines the operation to be performed and the inputs $I_M$ are connected to the plurality of AND circuits (not shown) described above which define the current word time or status of the counter.

Figure 7:
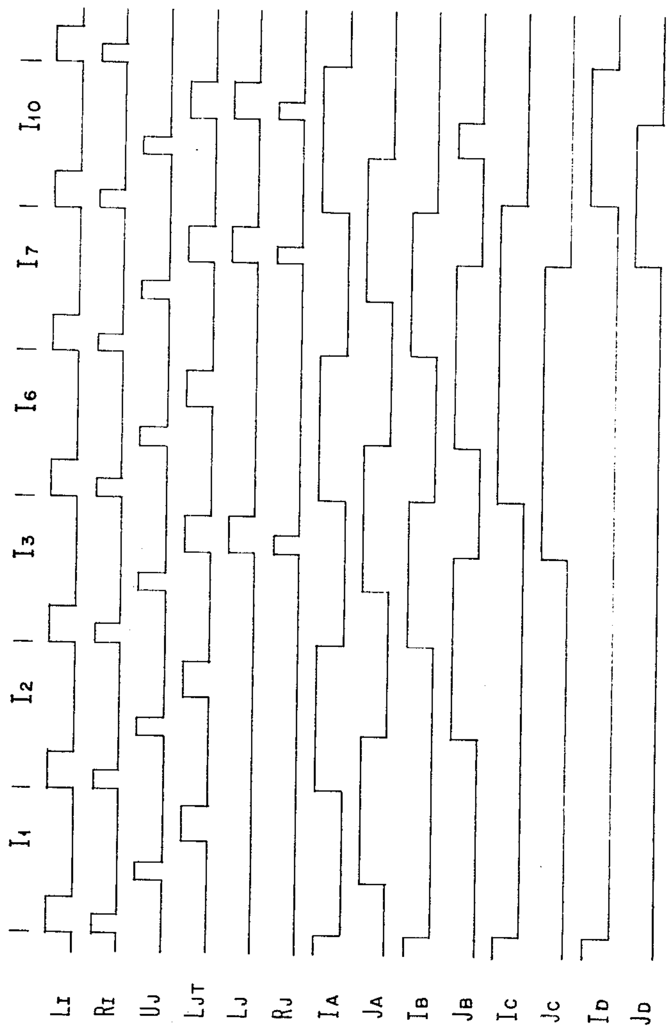
FIG. 7 is a timing diagram showing permutation of the counter shown in FIG. 1.

Trains of pulses $\overline{L_{JT}}$ and $R_{JT}$ occur on input lines 127 and 129 respectively. These pulses are timing inputs derived from the same clock source that the clock inputs for the counter shown in FIG. 1 were derived from. Referring now to FIG. 7, a timing diagram for a counter such as that shown in FIG. 1 where permuting occurs after word time $I_3$, $I_7$, and $I_{10}$ is shown. The timing pulses $L_{JT}$ and $R_{JT}$ (not shown) appear simultaneously and the pulse $L_{JT}$ is positive for a longer time duration than the pulse $R_{JT}$. Further, the pulses $L_{JT}$ and $R_{JT}$ occur between the pulses $U_J$ and $L_I$ which appear on the steering element upset line 39 and the counting element set line 37 of FIG. 1, respectively. This allows permutation to take place after the steering elements are set and before the counting elements are set.

Referring now once again to FIG. 6, the circuitry shown is for deriving output signals on lines $L_J$ and $\overline{R_J}$ which are utilized to set and reset respectively the steering elements of the counter shown in FIG. 1 when permuting is to occur. The input signals appearing on lines $I_M$ and $N_M$ define all of the times when permutation is to occur as listed hereinbefore for the present computer example and the timing input pulses $\overline{L_{JT}}$ and $R_{JT}$ gate the $I_M$ and $N_M$ inputs at the proper time (prior to the occurrence of signals on lines $L_I$ and $R_I$).

For example, if the operation to be performed was a P and Q Direct Instruction it is necessary that the clock permute from word time $I_3$ to $I_6$. Word time $I_3$ and condition $\overline{N_2}$ from the operational register have been ANDed together to form an input to logic element 121. Referring to the map of the operational register or N register shown above, it can be seen that the condition $\overline{N_2}$ occurs only during an Immediate Instruction, a P Indirect Instruction, or a P and Q Direct Instruction. Since the clock permutes from word time $I_2$ to word time $I_7$ during an immediate instruction, the condition $I_3$ and $\overline{N_2}$ never occurs during an immediate instruction because word time $I_3$ never occurs. Further, it is also desirous to permute the clock from word time $I_3$ to word time $I_6$ during a P Indirect instruction. Hence, whenever register $N_2$ is not true during word time $I_3$, the clock should permute.

The concurrence of positive signals on line $I_3$ and line $\overline{N_2}$ cause the input line on the left side of logic element 121 to be positive thereby causing the output line of logic element 121 to be negative. It is necessary for the signal on this output line to be negative and for the timing signal $\overline{L_{JT}}$ on line 127 to be negative simultaneously in order that logic element 123 will provide a positive output on line $L_J$. If either of these input lines to logic element 123 are positive, logic element 123 provides a negative output.

When a permuting condition such as $I_3$ and $\overline{N_2}$ is defined, and when a negative clock signal $\overline{L_{JT}}$ occurs on line 127, a timing pulse is generated on output line $L_J$ of logic element 123. Since timing pulse $R_{JT}$ appears simultaneously with timing pulse $\overline{L_{JT}}$, logic element 125 provides a negative signal on line $\overline{R_J}$ whenever a positive signal is provided on line $L_J$. As mentioned above, these two signals appearing on lines $I_J$ and $\overline{R_J}$ are utilized to set and reset respectively the steering elements shown in FIG. 1 prior to the beginning of the next counting cycle. The remaining permuting conditions defined by the control logic of FIG. 6 and their corresponding permuting conditions defined in terms of operations and word times is as follows:

$N_1$ AND $I_2$ for permuting the counter from $I_2$ to $I_7$ for immediate instructions.
$N_1$ AND $I_7$ for permuting the counter from $I_7$ to $I_{10}$ for immediate instructions.
$\overline{N_3}$ AND $I_7$ for permuting the counter from $I_7$ to $I_{10}$ for P and Q Direct instructions and for Q Indirect instructions.
$I_{10}$ for permuting the counter from $I_{10}$ to $I_1$, for all instructions.

Figure 8:
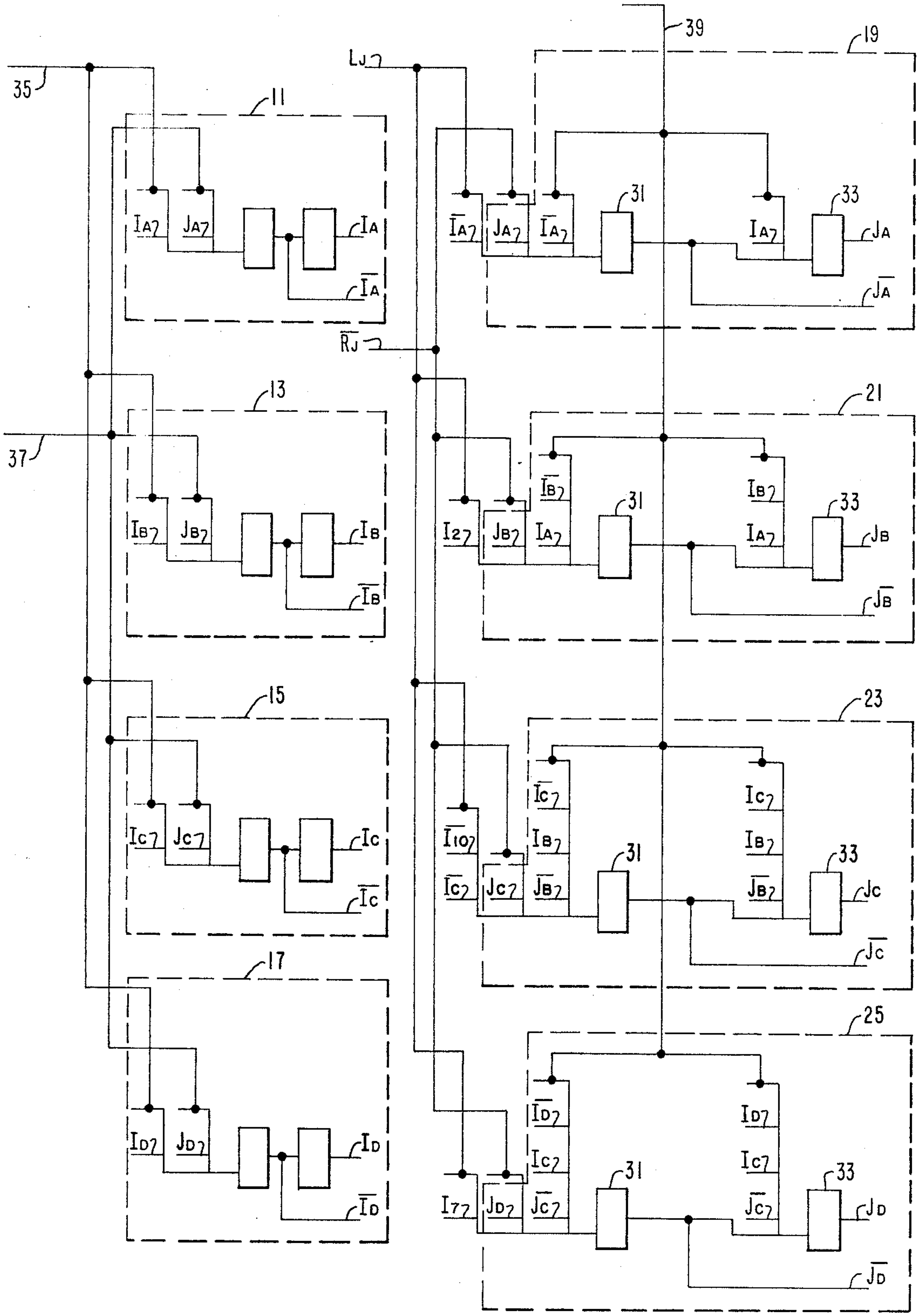
FIG. 8 is a logic diagram of the counter of FIG. 1 along with the necessary logic to control permuting.

Referring now to FIG. 8, counter such as that shown in FIG. 1 along with the necessary control inputs to provide a permutable counter is shown. The counting elements 11, 13, 15, and 17 appear in FIG. 8 exactly as they appear in FIG. 1. That is, no changes or additional inputs are required for the counting elements since the state that each counting element assumes is dependent solely upon the state of its corresponding steering element when counting or permuting.

The steering elements 19, 21, 23, and 25 are shown exactly as they are shown in FIG. 1. However, additional circuitry has been added to control the steering elements. Permute set line $L_J$ and permute reset line $\overline{R_J}$ having timing pulses described above have been added along with logic control lines $I_N$, $\overline{I_N}$, $I_M$ and $\overline{I_M}$ where the subscript N represents alphabetic subscripts A to D and the subscript M represents integer subscripts 1 to 10. The signals on these logic control lines define the state to which the steering elements permute when a permuting signal occurs on the permute set and reset lines. For the computer example given, it is desirous to permute from $I_2$ to $I_7$, $I_3$ to $I_6$, $I_7$ to $I_{10}$ and $I_{10}$ to $I_1$ during certain operations. As will be discussed, since a permuting signal is generated when permuting is to occur, it is only necessary that the logic control lines define the present state of the counter and the state to be assumed by the steering elements.

The latch back terms, $J_A$, of steering element 19, $J_B$ of steering element 21, $J_C$ of steering element 23, and $J_D$ of steering element of 25 have each been ANDed with the signal appearing on line $\overline{R_J}$ so that they are no longer coupled directly back to the input of logic element 31. Thus, in order for a steering element to remain in its on state providing a positive output on its in phase output line $\overline{J_N}$, it is necessary that the signal on line $\overline{R_J}$ be positive. The signal on this line is normally positive and is negative only when permuting is to occur. Therefore, the steering elements operate as described with respect to FIG. 1 when permuting does not occur. However, when permuting occurs, the pulse appearing on line $\overline{R_J}$ is a negative pulse and this negative pulse tends to cause all of the steering elements to be reset to their off state since a positive input is no longer applied to logic element 31.

Further, when permuting is to occur, a positive pulse appears on line $L_J$ simultaneously with the negative pulse appearing on line $\overline{R_J}$. The pulse on line $L_J$ is positive for a longer duration than the duration that the pulse on line $\overline{R_J}$ is negative. The positive pulse appearing on line $L_J$ is a gating pulse which gates certain preselected steering elements so that they are set to their on state. Since this pulse is of a longer duration than the reset pulse appearing on line $\overline{R_J}$, the preselected steering elements are not reset by the pulse on line $\overline{R_J}$. The preselected steering elements which are set are those which define the condition to be permuted to. The signals appearing on logic control lines $I_N$, $\overline{I_N}$, $I_M$ and $\overline{I_M}$ define which steering elements are selected.

For example, as discussed above, when performing a P and Q Direct operation, it is desirous to permute the clock from word time $I_3$ to word time $I_6$. Word time $I_3$ is defined in the heretofore mentioned Karnaugh Map as a positive output signal on line $I_B$ of counting element 13 while word time $I_6$ is defined as positive output signals on lines $I_A$ and $I_C$ of counting elements 11 and 15 respectively. (The remaining counting elements in each instance provide negative outputs on their in phase output lines.) Therefore, when permuting from word time $I_3$ to word time $I_6$, counting elements 11 and 15 must be turned on so as to provide positive output signals on their respective in phase output lines $I_A$ and $I_C$. Counting elements 13 and 17 should be off at this time. Since the counting elements assume a state dependent upon their associated steering elements it is necessary to turn steering elements 19 and 23 on and steering elements 21 and 25 off prior to the initiation of the counting cycle with the counting element set pulse $L_I$ on line 35.

Pulses appear on line $\overline{R_J}$ and line $L_J$ during word time $I_3$ of a P and Q Direct Instruction. The pulses $R_J$ and $L_J$ can be seen in FIG. 7. The pulse on line $\overline{R_J}$ tends to reset all of the steering elements to their off state as described above while the pulse on line $L_J$ sets preselected steering elements. Referring once again to FIG. 8, in the present example, it is desirous to preselect steering elements 19 and 23. This is accomplished by gating the signal on line $L_J$ with the signal on line $\overline{I_A}$ to form a set input to steering element 19 and gating the signal on line $L_J$ with the signals on lines $\overline{I_C}$ and $\overline{I_{10}}$ to form a set input to steering element 23. Since the clock is permuting from word time $I_3$ to word time $I_6$, it is to be noted that during word time $I_3$ counting element $I_A$ is false thereby providing a positive output on its out of phase output line $\overline{I_A}$. Further, at this time, counting element 15 also provides a positive output on line $\overline{I_C}$ and additionally, line $\overline{I_{10}}$ is positive since it is word time $I_3$. Hence, steering elements 19 and 23 are set positive. Conversely, steering elements 21 and 25 are not set positive since the setting terms for these elements are not met. That is, it is not time $I_2$ and therefore, the AND condition with line $L_J$ is not met for steering element 21. Further, it is not time $I_7$ and therefore, the AND condition with line $L_J$ for steering element 25 is not met.

Counting elements 11 and 15 corresponding to steering elements 19 and 23 will be set upon the occurrence on the next pulse appearing on the set line $L_1$ in the same manner they were set when counting as described with respect to FIG. 1.

As discussed above, it is also desirous to permute from word times $I_2$ to $I_7$, $I_7$ to $I_{10}$, and $I_{10}$ to $I_1$ during certain operations. Reference to the heretofore mentioned Karnaugh Map shows that word time $I_2$ is defined as a positive signal on line $I_A$, word time $I_7$ is defined as a positive signal on lines $I_B$ and $I_C$, word time $I_{10}$ is defined as a positive signal on lines $I_A$ and $I_D$, and word time $I_1$ is defined as an absence of positive signals on the in phase output lines of the counting elements.

When permuting from $I_2$ to $I_7$, only steering elements 21 and 23 must be turned on. This is accomplished by gating the signal on line $L_J$ with the positive signal on line $I_2$ to form a set input to steering element 21 and gating the signal on line $L_J$ with the positive signals $\overline{I_{10}}$ and $\overline{I_C}$ to form a set input to steering element 23. These gating signals are positive since the clock is permuting from word time $I_2$. It is to be noted that steering element 19 will not set at this time since its set signal $\overline{I_A}$ is negative and that steering element 25 will not set at this time since its set signal $I_7$ is negative.

Similarly, when permuting from $I_7$ to $I_{10}$, the permute set signals of steering elements 19 and 25 are positive while those of steering element 21 and the $\overline{I_C}$ permute set signal of steering element 23 are negative. Thus, only steering elements 19 and 25 will set.

When permuting from $I_{10}$ to $I_1$, none of the steering elements will set since all have a negative permute set signal.

Thus it can be seen that by gating the proper timing and control signals to the steering elements, they can be readily permuted to any desired condition. This is done without affecting any of the counting elements until the next counting cycle. Hence, the outputs of the counting elements can be utilized to control machine functions during the entire counting cycle and the additional logic necessary to control permuting is all coupled to the steering elements.

Relating the counting circuits in FIG. 8 with the general block diagram shown in FIG. 3, it can be appreciated that the clock pulse interface 107 consists of the following input lines: the counting element set line $L_I$, the steering element upset line $U_J$ and the counting element reset line $\overline{R_I}$. The permuting interface 113 corresponds to the added circuitry on the left hand side of the steering latches of FIG. 8 and more particularly the timing signals $L_J$ and $R_J$ the permute set terms shown. The timing signals $\overline{L_{JT}}$ and $R_{JT}$ supplied to the control circuitry shown in FIG. 6 correspond to the signals appearing on the clock control interface 109 of FIG. 3.

As is appreciated by those skilled in the art, a four stage counter was utilized by way of example only and that a counter embodying the principles of the present invention can have any number of stages. Further, the bistable binary elements utilized herein by way of example were latch circuits well known to those skilled in the electronics art. The use of equivalent circuits such as, for example, trigger circuits, magnetic storage elements, capacitor storage elements, or other bistable elements is well within the scope of the present invention.

Additionally, the control logic utilized to permute the counter was shown by way of example only. Any control circuitry which sets the steering elements to a predetermined state prior to the occurrence of the subsequent counting cycle could be utilized.

While the invention has been particularly shown and described with reference to a preferred embodiment thereof it would be understood by those skilled in the art that the foregoing and other changes in form and details may be made therein without departing from the spirit and scope of the invention.

What is claimed is:

1. A high speed binary counting circuit comprising:

a plurality of counting elements and a plurality of steering elements, individual ones of said counting elements corresponding to individual ones of said steering elements;

each of said counting and steering elements being actuatable by external signals to assume one of two states;

each of said counting elements having a set line and an output line;

each of said steering elements having an upset line and an output line;

a first source of pulses coupled to each set line and a second source of pulses coupled to each upset line, the pulses appearing on said set lines being out of phase with the pulses appearing on said upset lines;

the signals appearing on the output lines of the counting elements being counting signals indicating the count stored in the counting circuit;

the signals appearing on the output lines of the steering elements being steering signals;

first gating means for gating the pulses on the set line of each counting element with the steering signal from each corresponding steering element, each counting element being responsive to the output signal of the gating means to assume a binary state solely dependent upon the state of its corresponding steering element upon the incidence of a pulse on the set line;

means connected to each counting element for maintaining each counting element in its assumed stable state upon the termination of each pulse on the set line;

second gating means for gating the pulses on the upset line of each steering element with the steering signal from the preceding steering element, the counting signal from the corresponding counting element and the counting signal from the preceding counting element, each steering element being responsive to the output signal of the second gating means for assuming a binary state dependent upon the state of the preceding counting and steering elements and the corresponding counting element upon the incidence of a pulse on the upset line.

2. The high speed binary counting circuit set forth in claim 1 wherein:

each of said steering elements have a permute set line;

a source of pulses coupled to the permute set lines occurring out of phase with the signals appearing on the counting element set lines;

control logic means responsive to the output signals of the counting elements for supplying a permuting signal in response to at least one indicated count, said permutting signal being coupled to at least one steering element for defining the binary state that said at least one steering element assumes upon the occurrence of a pulse on the permute set line.

3. An N stage binary counter where N is an integer comprising:

N first bistable elements each responsive to a first train of input pulses to assume a binary state;

N second bistable elements each responsive to a second train of input pulses occurring out of phase with said first train of input pulses to assume a binary state, each second bistable element corresponding to a first bistable element, each second bistable element and its corresponding first bistable element comprising a counter stage;

each of said first bistable elements being coupled to the bistable elements of the preceding stage and its corresponding second bistable element to assume a binary state solely dependent on the bistable states of said bistable elements coupled thereto upon the occurrence of an input pulse from said first train of input pulses;

each of said second bistable elements being coupled to its corresponding first bistable element to assume a binary state solely dependent thereon upon the occurrence of an input pulse from said second train of input pulses.

4. The N stage binary counter set forth in claim 3 further comprising:

control logic means;

the binary state assumed by each of said first bistable elements being further dependent upon the state of said control logic means for selectively defining the state to be assumed by each first bistable element.

5. The N stage binary counter set forth in claim 3 wherein:

each of said bistable elements is a latch circuit, and each of said first bistable elements is responsive to its corresponding second bistable element which indicates the binary state of the associated counter stage of said first bistable element and said second bistable element.

6. The N stage binary counter set forth in claim 4 wherein:

said control logic means is responsive to the binary state of at least one second bistable element for selectively defining the state to be assumed by each first bistable element.

References Cited

UNITED STATES PATENTS

| | | | |
|---|---|---|---|
| 3,354,295 | 11/1967 | Kulka | 235—92 |
| 3,356,953 | 12/1967 | Petzold | 328—44 |
| 3,377,468 | 4/1968 | Petzold | 235—92 |
| 3,387,118 | 6/1968 | Petzold | 235—92 |
| 3,443,071 | 5/1969 | Petzold | 235—92 |

MAYNARD R. WILBUR, Primary Examiner

G. R. EDWARDS, Assistant Examiner